Feb. 17, 1970　　　D. P. HASS ET AL　　　3,495,675
VEHICLE SAFETY METHOD AND APPARATUS USING
EXPANDABLE CONFINEMENT
Filed July 17, 1967　　　2 Sheets-Sheet 1

INVENTORS
DAVID P. HASS
HERMANN KAISER
KENNETH W. SCHANG

BY
ATTORNEYS

INVENTORS
DAVID P. HASS
HERMANN KAISER
KENNETH W. SCHANG

ATTORNEYS

United States Patent Office 3,495,675
Patented Feb. 17, 1970

3,495,675
VEHICLE SAFETY METHOD AND APPARATUS USING EXPANDABLE CONFINEMENT
David P. Hass and Hermann Kaiser, Detroit, and Kenneth W. Schang, Dearborn, Mich., assignors to Eaton Yale & Towne Inc., Cleveland, Ohio, a corporation of Ohio
Filed July 17, 1967, Ser. No. 653,785
Int. Cl. B60k 27/00, 33/00; H01h 3/16
U.S. Cl. 180—91
9 Claims

ABSTRACT OF THE DISCLOSURE

A safety device for an automotive vehicle is actuated to protect an occupant of the vehicle during a crash. The safety device is actuated by an actuating mechanism having a plurality of sensing devices for sensing conditions experienced by the vehicle and which all must be actuated in order to cause actuation of the safety device. The sensing devices comprise an acceleration or inertia operated switch and a crush switch responsive to deformation of the vehicle. The switches are in series in an electric circuit with the safety device. Alternately, a manual switch or speed responsive switch or a switch responsive to depression of a brake pedal could be employed in place of or in addition to the crush switch.

---

The present invention relates to a vehicle safety method and apparatus, and more particularly to a vehicle safety method and apparatus wherein a safety device for protecting an occupant of the vehicle is actuated only when a crash is occurring which would in all probability cause injury to the occupant.

Known safety systems for automotive vehicles have included safety devices which are actuated to protect the occupant or occupants of a vehicle. The actuation of such a safety device at the proper time under the proper conditions is extremely important in providing a reliable and practical system. The known safety systems have the disadvantage that the safety device could be actuated during certain non-critical crash situations where there is very little likelihood of any injury being caused to the occupant or occupants of the vehicle. In many non-critical crash situations, the safety device should not be actuated. Moreover, these known systems are slow in actuating the safety device.

Accordingly, it is an important object of the present invention to provide a new and improved vehicle safety method and apparatus in which a safety device for protecting an occupant of the vehicle is actuated only when a critical crash is occurring which would in all probability cause injury to the occupant or occupants of the vehicle.

Another object of the present invention is to provide a new and improved vehicle safety apparatus for use in a vehicle and which includes a plurality of sensing devices for sensing when certain conditions are experienced by the vehicle and which are operable to actuate a safety device on the vehicle only when all of such conditions are sensed.

Yet another object of the present invention is to provide a new and improved vehicle safety apparatus, as defined in the next preceding object, and in which the plurality of sensing devices are located in series in a circuit with the safety device whereby all of the sensing devices have to be in an actuated condition simultaneously to effect actuation of the safety device.

A further object of the present invention is to provide a new and improved vehicle safety apparatus for use in a vehicle and which includes a safety device for protecting the occupant or occupants of a vehicle when a critical crash is occurring, and which includes a deceleration responsive device for actuating an associated switch located in an electric circuit with an actuating means for actuating the safety device and a crush responsive device for actuating an associated switch in series with the other switch when the vehicle is subjected to a predetermined deformation whereby both switches have to be actuated in order to actuate the safety device.

A still further object of the present invention is to provide a new and improved safety apparatus for use in an automotive vehicle and in which a safety device for protecting the occupant or occupants is actuated in response to actuation of an associated switch of a deceleration sensing device, and wherein a separate control means operatively connected with the deceleration sensing device is provided for reducing the value of the force required for the device to actuate the switch.

The present invention also resides in certain novel constructions and arrangement of parts, and other objects, novel characteristics and advantages of the present invention will be apparent from the following detailed description and in the accompanying drawing forming a part of this specification, and in which similar reference numerals designate corresponding parts throughout the several views of the drawing and in which.

The novel safety method and apparatus of the present invention can be employed in various kinds or types of vehicles, but is particularly susceptible of use in automotive vehicles and airplanes, and for purposes of illustration is herein shown and described as being used in an automobile 10.

The safety apparatus or system of the present invention broadly comprises a plurality of sensing devices for sensing certain conditions being experienced by the automobile. The sensing devices are located in series in a circuit with a safety device which is operable to protect the occupant or occupants of the automobile against injury. The sensing devices are operable to cause actuation of the safety device only when all conditions are experienced by the automobile.

More specifically, the safety apparatus of the present invention is designed to insure that the safety device for the occupant is actuated only when a critical crash or collision is occurring, i.e., one which would in all probability cause injury to the occupant or occupants. To this end, the safety apparatus includes, in the preferred embodiment, a sensing device or means which effects actuation of an associated switch when the vehicle is experiencing a predetermined acceleration or deceleration and a crush sensing device or means which effects actuation of an associated switch when the vehicle is subjected to a predetermined deformation during a collision. Both of these switches are located in series in a circuit with the safety device and both must be actuated in order to effect actuation of the safety device. This sensing of plural crash or collision criterion insures actuation of the safety device only under the proper conditions which would in all probability cause injury to the occupant or occupants.

Figure 1:
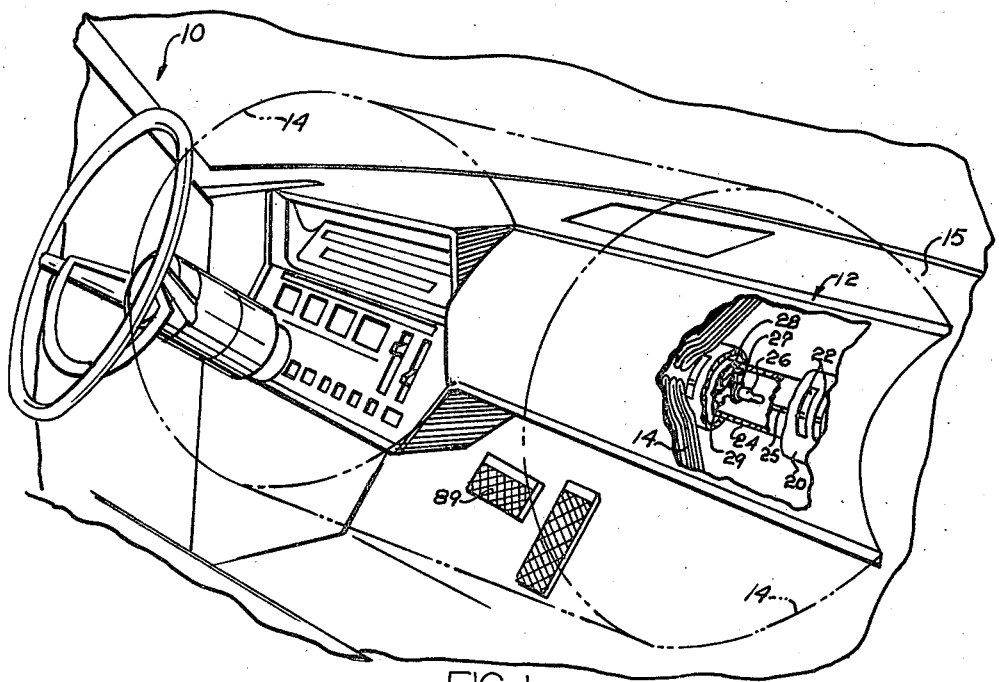
FIG. 1 is a fragmentary perspective view of an interior of an automobile embodying the safety apparatus of the present invention.

The safety device which is actuated by the plural sensing devices may take different forms. Preferably, and as shown in FIG. 1, the safety device 12 comprises an inflatable crash restraint confinement 14 mounted within a dashboard 15 of the automotive vehicle 10. The inflatable confinement 14 is normally in a collapsed or folded position, as shown by the solid lines in FIG. 1, in which it gives the appearance of being a continuation of the dashboard 15 and is secured to a cylindrical diffuser tube 20 mounted within the dashboard 15. The diffuser tube 20 has a plurality of longitudinally spaced, circumferentially extending slots 22 which communicate the interior of the diffuser tube 20 with the interior of the confinement 14.

Disposed within the diffuser tube 20 is a cylindrically shaped container or reservoir 24 containing a supply of high pressure gas, such as nitrogen. The cylindrical container 24 is provided with at least one longitudinally extending weakened portion 25 located adjacent the slots 22 in the diffuser tube 20 so as to enable the tube to be readily split longitudinally thereof to permit the escape of the high pressure gas into the diffuser tube 20 and through the openings 22 to inflate the confinement 14.

The cylindrical container 24 is adapted to be split along the weakened portion 25 to permit release of the high pressure gas in response to actuation of an explosive squib or charge 26. The explosive squib 26 is disposed within the cylinder 24 and is carried by a bracket 27 attached to the inner side wall of the cylinder 24. The squib 26 is exploded by passing electric current through a pair of lead wires 28 and 29 electrically connected with the squib 26.

From the foregoing, it can be seen that when the squib 26 is exploded, the explosive force will cause the weakened portion 25 of the cylindrical container 24 to give and thus, cause the same to be split longitudinally thereof to permit release of the high pressure gas contained therein. The released gas flows into the diffuser tube 20 and then through the openings 22 into the confinement 14 to inflate the latter. The confinement 14 upon being inflated moves outwardly of the dash 15 toward the back of the front seat of the automobile 10. The confinement 14 when fully inflated will assume the position shown by the dotted lines in FIG. 1. The confinement 14 when inflated provides a resilient restraint which prevents the occupant or occupants in the front seat from being thrown forward against the dash and/or windshield of the automobile.

Figure 3:
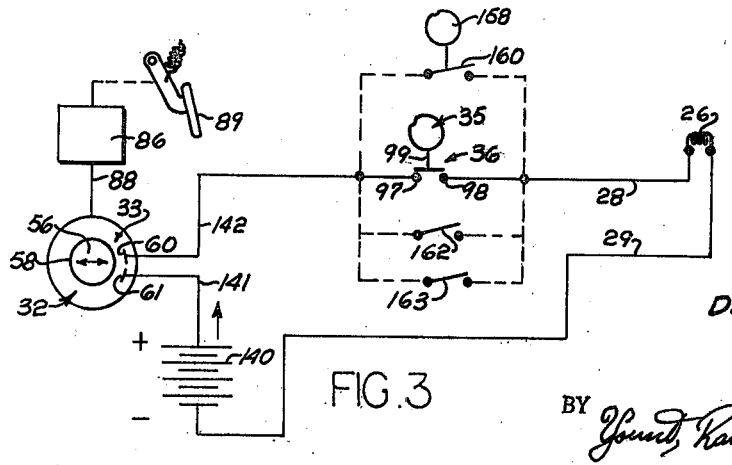
FIG. 3 is a schematic view of the control circuit for the safety apparatus of the present invention.

In accordance with the provisions of the present invention, a novel actuating mechanism 30 is provided for actuating the explosive squib 26. The actuating mechanism 30, in the preferred embodiment, is operable to explode the squib 26 only when a critical crash is occurring. As schematically shown in FIG. 3, the novel actuating mechanism 30, in the preferred embodiment, includes a sensing device 32 which effects actuation of an associated switch 33 when the vehicle is experiencing a predetermined deceleration or acceleration in any direction and a crush sensing device 35 which effects actuation of an associated switch 36 when the vehicle is subjected to a predetermined deformation during a collision. The associated switches 33 and 36 of the sensing devices 32 and 35, respectively, are in series with each other in an electric circuit with the explosive squib 26 and function to actuate or explode the explosive squib 26 to inflate the confinement 14 when both are simultaneously in an actuated condition, as will hereinafter be more fully described.

Figures 4, 5:
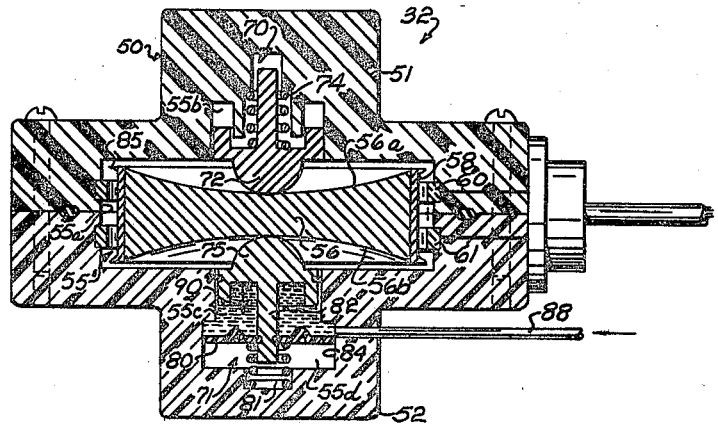
FIG. 4 is a cross-sectional view of a deceleration responsive device and associated switch used in safety apparatus.
FIG. 5 is a cross-sectional view with parts shown in elevation of a crush responsive device and associated switch used in the safety apparatus.

Referring to FIG. 4 of the drawing, the deceleration sensing device 32 comprises a plastic housing 50 which is adapted to be secured to a suitable support on the automobile 10. The housing 50 comprises upper and lower generally complementary formed sections 51 and 52 which were bolted together and which define an inner chamber 55. The chamber 55 includes an intermediate cylindrical portion 55a of a relatively large diameter and generally cylindrical end portions 55b and 55c having a diameter which is less than the diameter of the intermediate portion 55a.

Disposed within the intermediate chamber portion 55a is a metal sensing disk 56 having concave upper and lower sides 56a and 56b. The sensing disk 56 carries an annular, metal contact ring 58 on the outer periphery thereof and the housing sections 51 and 52 respectively carry annular metal ring contacts 60 and 61 on the inner side wall thereof which define the chamber portion 55a. The contacts 60, 61 are switch contacts which are located in an electric circuit with the explosive squib 26 and the annular ring 58 carried by the sensing disk 56 comprises a switch element for electrically connecting the contacts 60 and 61 when the former is in engagement therewith.

The sensing disk 56 is normally centrally disposed within the chamber portion 55a so that the contact ring 58 is spaced from the switch contacts 60 and 61 carried by the housing 50. The sensing disk 56 is restrained against movement from this position relative to the housing 50 by a pair of biasing means 70 and 71 carried by the housing sections 51 and 52, respectively. The biasing means 70 comprises a spring biased plunger 72 having a curved lower end, as viewed in FIG. 4, which engages the concave upper surface 56a of the sensing disk 56 with a predetermined force. The plunger 72 is slidably received for vertical movement in the cylindrical chamber portion 55b of the housing section 51 and is biased into engagement with the upper surface 56a of the sensing disk 56 by a compression spring 74. The compression spring 74 has one end in abutting engagement with the plunger and with the other end in abutting engagement with the housing section 51.

The biasing means 71 comprises a spring biased plunger or piston 75 having a curved upper end, as viewed in FIG. 4, which engages the concave lower surface 56b of the sensing disk 56 with a predetermined force. The plunger 75 is slidably received for vertical movement in the cylindrical chamber portion 55c, and is biased into engagement with the lower surface 56b of the sensing disk 56 by a resilient diaphragm 80 and a compression spring 81. To this end, the plunger 75 includes a downwardly extending rod portion 82 which is suitably secured to the diaphragm 80. The diaphragm 80 along its outer edge is secured to the side wall 84 defining a chamber portion 55d which is of a larger diameter than the chamber portion 55c. The compression spring 81 has one end in abutting engagement with the housing section 52 and the other end in abutting engagement with the underside of the diaphragm 80, as viewed in FIG. 4. The resilient diaphragm 80 and the compression spring 81 bias the plunger 75 into engagement with the lower side 56b of the sensing disk 56 with a predetermined force.

From the foregoing, it should be apparent that movement of the sensing disk 56 horizontally relative to the housing 50 so that the contact ring 58 engages the contacts 60, 61 of the associated switch occurs only when the deceleration force acting on the housing and automobile due to either deceleration or acceleration is in excess of a predetermined value, preferably of a value which occurs only when a collision is experienced. By varying the contour of the surfaces 56a and 56b and/or the force of the springs 74 and 81, the value of the force required to effect closure of the contacts 60, 61 can be varied. Also, it should be noted that the acceleration and deceleration responsive device 32 is sensitive in all horizontal directions. The contact ring 58 is preferably provided with an annular horizontally extending knife-like edge 85 for the purpose of providing information on the performance of the device 32 in the event of a vehicle collision. A portion of the annular knife edge will be deformed upon striking the housing 50 during a collision, the location and extent of the deformation indicating the direction and magnitude of the collision.

In accordance with another aspect of the present invention, the force required to effect movement of the sensing disk 56 relative to the housing 50 so that the contact ring 58 closes the contacts 60, 61 can be reduced when the operator is anticipating a crash situation. To this end, the chamber 55c located between the resilient diaphragm 80 and the underside of the plunger 75 is adapted to be connected with the main brake cylinder 86 (see FIG. 3) of the automobile by a conduit 88 so that the hydraulic fluid in the chamber 55c is pressurized in response to depression of the brake pedal 89 of the automobile. When the hydraulic fluid in the chamber 55c is pressurized upon depression of the brake pedal 89 and, since the area of the diaphragm 80 is greater than the area of the underside of the plunger 75, the diaphragm 80 will be moved downwardly, as indicated by the arrow 90 in FIG. 4. Movement of the diaphragm 80 in this direction causes the plunger 75 to be moved downwardly which in turn effects a reduction in the biasing forces exterted on the disk 56 by the biasing means 70 and 71. This reduces the force required to effect relative movement between the sensing disk 56 and the housing 50. The extent of the reduction in the basing force exerted by the biasing means 70, 71 upon depression of the brake pedal will vary in accordance with the extent to which the brake pedal is depressed. It will, of course, be understood that other manually or selectively operable controls connected with suitable actuators for pressurizing the hydraulic fluid in the chamber 55c could be provided in addition to or in place of the brake pedal control, if desired.

Referring to FIG. 5 of the drawing, the crush sensing device 35 and the associated switch 36 are there schematically shown. The device 35 generally comprises a housing 94 which is adapted to be secured to a suitable support on the automobile 10, and an actuating mechanism 95 carried by the housing 94 and which is operable to actuate the associated switch 36 when the former is subjected to a predetermined impact force.

The associated switch 36 comprises a pair of stationary contacts 97, 98 located in the electric circuit with the explosive squib 26 and a movable switch contact or element 99 which is normally spring biased toward an open position, as shown by the solid lines in FIG. 5, by a spring 100. The contacts 97, 98 are carried by an insulating member 101 secured to the housing 94. The switch element 99 is carried at one end of an actuating member 110 which is slidably received in an opening 111 in the housing 94.

The actuating member 110 is biased by the spring 100 to a normal position, as shown by the solid lines in FIG. 5, in which a shoulder 112 thereon abuts a shoulder 113 on the housing 94 and in which the contact element 99 is spaced from the contacts 97, 98. As shown in FIG. 5, the left end of the actuating member projects outwardly from the housing 94 and is secured to a semi-spherical member 120 which extends transversely of the actuating member 110.

Figure 2:
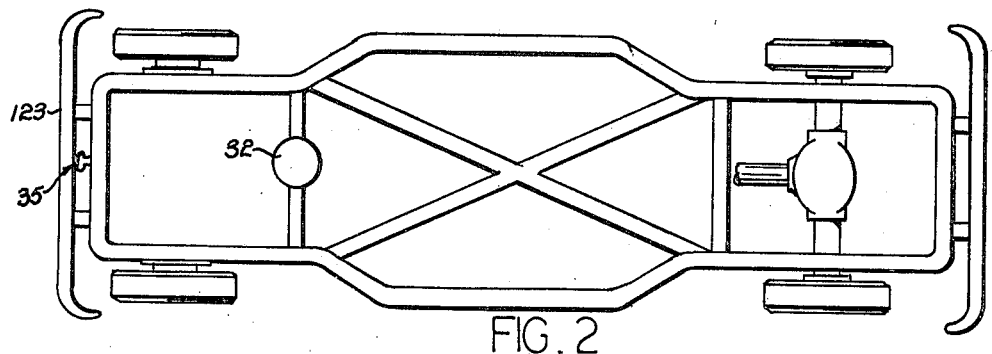
FIG. 2 is a schematic view of an automobile frame showing the location of some of the sensing devices of the safety apparatus of the present invention.

The sensing device 35 can be mounted on the automobile 10 at any suitable location and is herein shown (see FIG. 2) as being mounted on the front part of the frame directly behind the front bumper 123 of the automobile. When the automobile is in a front end crash or collision of a magnitude such that the bumper is crumpled and moved rearwardly toward the frame, the bumper 123 engages the member 120 and moves the same toward the right. As the member 120 moves toward the right, it moves the actuating member 110 toward the right, as viewed in FIG. 5. Movement of the actuating member toward the right causes the contact element 99 to be moved toward the right in opposition to the biasing force of the spring 100 toward its closed position in which it engages the contacts 97, 98, as shown by the dotted lines 129 in FIG. 5. When the member 120 has been moved to the position shown in the dotted lines 129 in FIG. 5, the switch element 99 will have moved to its closed position.

From the foregoing, it should be apparent that the switch 36 is actuated only upon the actuating member 110 having been moved a predetermined extent, the extent of the movement of the actuating member 110, in turn, being dependent upon the extent the bumper 123 is crumpled or moved from its normal position toward the frame of the automobile. Since the extent of movement of the bumper when a front end collision occurs will be dependent upon the magnitude of the collision, the switch 36 will be in effect actuated only when the automobile has been subjected to a critical collision in which the deformation thereof has exceeded a predetermined magnitude.

The operation of the actuating mechanism 30 for actuating the explosive squib 26 will best be understood from a description of the schematic control diagram or circuit shown in FIG. 3. Assuming that a critical front end crash or collision is occurring, the forces acting on the vehicle due to the rapid deceleration of the latter will cause the sensing disk 56 to move relative to the housing 50 and the contact ring 58 into engagement with contacts 60 and 61 to close the switch 33. The magnitude of the force during deceleration required to be experienced by the vehicle to effect movement of the sensing disk 56 relative to the housing 50 may be reduced if the operator had previously depressed the brake pedal of the automobile, and for reasons hereinbefore described. As the front end collision is occurring the front bumper 123 is deformed and crumpled or moved toward the frame of the automobile. As the bumper 123 moves toward the frame, it will effect closing of the switch 36.

When both switches 33 and 36 are moved to their closed position, a circuit is completed from battery 140, wire 141, switch 33, wire 142, switch 36, wire 28, the explosive squib 26, wire 29, to the battery. When this circuit is completed, the explosive squib will be energized and exploded which in turn will cause the container 24 to be split longitudinally thereof to release the compressed gas therein and effect inflation of the confinement 14 to the dotted line position shown in FIG. 1 to prevent injury to the occupants. It has been found that the time required to effect full inflation of the confinement 14 upon a critical collision occurring is approximately twenty milliseconds.

It will, of course, be understood that in actual practice multiple crush sensing devices like the sensing device 35 would be employed and located on the rear and sides of the frame in addition to the front of the frame so that regardless of the location on the automobile of the crush force one of these devices would be actuated. Each of the switches 36 of these devices would be in parallel with each other in the circuit but in series with the switch 33.

Alternatively, a low speed sensing device 158 and associated switch 160, a brake pedal switch 162 or a manually operated switch 163 suitably located on the vehicle for manual operation of the driver could be employed in series with the switch 33 and in place of the crush responsive switch 36 previously described. The low speed sensing device is schematically illustrated in FIG. 3 and its associated switch 160 is shown in the circuit indicated by the dotted lines. The switch 160 would be open when the automobile is traveling under a predetermined rate of speed and would be closed to connect wires 142 and 28 when the vehicle is traveling in excess of the predetermined speed. Any suitable or conventional speed sensing device could be employed to actuate the switch 160 to its closed position, and in a manner well understood by those skilled in the art. The brake pedal switch 162 would be a normally open switch and be located in series with the switch 33 and connect wires 142 and 28 as shown in the circuit indicated by the dot-dash lines in FIG. 3. The brake switch 162 would be moved to its closed position in response to depression of the brake pedal. Likewise, the manually operable switch 163 would be a normally open switch located in series with the switch 33 and connect wires 142 and 28, as indicated by the double dot-dash lines in FIG. 3. The switch 163 would be moved to its closed position in response to the operator manually moving the same to its closed position in anticipation of a crash.

It will, of course, be understood that either the low speed cut-out switch 160, brake pedal switch 162, or manually operable switch 163 could also be employed in series with both the switch 33 and the switch 36 or any combination of these switches in series could be used depending upon the crash criterion desired to be sensed. Although the concept of employing plural sensing devices has been described with reference to energizing an electric circuit for actuating a safety device, it will, of course, be understood that the plural sensing devices could be used to actuate a hydraulic circuit or to actuate a mechanical linkage for actuating a safety device. Moreover, the sensing devices are illustrated as electrical in nature and both mechanical or hydraulic sensing devices could also be utilized.

From the foregoing, it should be apparent that the novel actuating mechanism 30 actuates the safety device 12 only when the crash conditions being experienced by the vehicle are such that the occupant or occupants in all likelihood would be seriously injured. The actuating mechanism 30 is highly reliable in operation and insures that actuation of the safety device 12 does not occur unless the critical crash situation is occurring.

From the foregoing, it should be apparent that the hereinbefore enumerated objects and others have been accomplished and that a new and improved safety apparatus for use in an automotive vehicle has been provided. Although the illustrated embodiment herein has been described in great detail, it should be apparent that certain modifications, changes, and adaptations may be made in the illustrated embodiment.

What is claimed is:

1. Safety apparatus for use in a vehicle comprising an actuating mechanism for sensing when a critical collision is being experienced and which is operable to actuate a safety device on the vehicle during the collision, said actuating mechanism comprising a deceleration responsive device for sensing a force being experienced by the vehicle and which is operable to actuate an associated first control means in a circuit with the safety device when the force is greater than a predetermined value, and a second device for sensing when the vehicle is being subjected to a predetermined deformation and which is operable to actuate an associated second control means in said circuit when said predetermined deformation is sensed said first and second control means being in series with each other and effecting actuation of the safety device only when both are actuated, said safety device including an inflatable bag, a reservoir of compressed gas and an actuating means in said circuit for effecting release of the compressed gas from the reservoir into the bag to inflate the latter and being energized upon completion of said circuit.

2. A safety apparatus as defined in claim 1 wherein said circuit is an electric circuit and said first and second control means are switches, the first and second switches being actuated from a normally open to a closed position by said deceleration responsive device and second device when the force and deformation experienced by the vehicle are greater than a predetermined value to complete said electric circuit and actuate said safety device.

3. In a vehicle, a safety device actuatable to protect an occupant of the vehicle during a collision, said safety device comprising an expandable confinement having an expanded operative condition restraining movement of an occupant of the vehicle and an inoperative collapsed condition, means for expanding said confinement, sensing means for sensing certain collision related conditions experienced by the vehicle and operable to actuate said said means for expanding said confinement when such conditions are experienced, said sensing means comprising first means for sensing deceleration experienced by the vehicle and second means for sensing deformation of the vehicle, and means interconnecting said first and second means and said means for expanding said confinement to effect actuation of said means for expanding said confinement in response to said first and second means sensing that the vehicle is experiencing said first and second collision related conditions.

4. In a vehicle as defined in claim 3 wherein said first and second means include first and second control means in series with each other and with said means for expanding said confinement.

5. In a vehicle as defined in claim 4 wherein said first means comprises a deceleration responsive device operable to actuate said first control means when the vehicle is subjected to a deceleration greater than a predetermined value.

6. In a vehicle as defined in claim 4 wherein said first and second control means comprise switches in an electric circuit, said switches being actuated from a normally open to a closed position upon said first and second means sensing said first and second conditions, respectively, to complete said circuit and effect actuation of said means for expanding said confinement.

7. A method of protecting an occupant of a vehicle during a collision, said method comprising the steps of sensing a first collision related condition experienced by the vehicle, sensing a second collision related condition experienced by the vehicle, and actuating a safety device for protecting the occupant of the vehicle during the collision while the vehicle is experiencing said first and second collision related conditions, said first collision related collision related condition comprising deceleration of the vehicle and said second collision related condition comprising the deformation of the vehicle due to the collision.

8. A method of protecting an occupant of a vehicle during a collision, said method comprising the steps of sensing a first collision related condition experienced by the vehicle, sensing a second collision related condition experienced by the vehicle, and actuating a safety device for protecting the occupant of the vehicle during the collision while the vehicle is experiencing said first and second collision related conditions, said first collision related collision related condition comprising deceleration of the vehicle and sensed by a deceleration responsive device and further including the step of reducing the force required to actuate said device upon depression of the brake pedal of the vehicle.

9. Safety apparatus for use in a vehicle comprising an expandable confinement having an expanded operative condition restraining movement of an occupant of the vehicle and an inoperative collapsed condition, means for expanding said confinement, sensing means for sensing when a collision is occurring and operable to actuate said means for expanding said confinement, said sensing means comprising a device for sensing a first collision related condition, first switch means actuatable by said device and in an electric circuit with said means for expanding said confinement, second switch means in said circuit and actuatable when a second collision related condition is sensed, said first and second switch means being in series in said circuit and effecting actuation of said means for expanding said confinement only when both of said switch means are actuated, said means for expanding said confinement comprising a fluid supply and explosive means for actuating the flow of fluid from said fluid supply into said confinement, said device comprising a deceleration responsive device operable to actuate said first switch means upon the vehicle experiencing a deceleration greater than a predetermined value, and said second switch means being operatively associated with a second device responsive to deformation of a portion of the vehicle.

References Cited

UNITED STATES PATENTS

| | | | |
|---|---|---|---|
| 2,477,933 | 8/1949 | Labser | 200—61.53 |
| 2,573,199 | 10/1951 | Holman | 200—61.53 |
| 2,588,815 | 3/1952 | Fasolino | 180—92 |
| 2,834,606 | 5/1958 | Bertrand | 280—150 |
| 2,850,291 | 9/1958 | Ziccardi | 280—150 |
| 3,123,801 | 3/1964 | Bosler | 200—61.45 X |
| 3,141,707 | 7/1964 | Nigh | 180—104 |
| 3,215,792 | 11/1965 | Lawyer | 200—61.5 |
| 3,218,405 | 11/1965 | Young | 200—61.53 |
| 3,278,766 | 10/1966 | Ticknor | 200—61.45 |
| 3,292,726 | 12/1966 | Jette | 280—104 |

KENNETH H. BETTS, Primary Examiner

U.S. Cl. X.R.

180—103; 200—61.44, 61.45; 280—150

PO-1050
(5/69)

UNITED STATES PATENT OFFICE
CERTIFICATE OF CORRECTION

Patent No. 3,495,675          Dated February 17, 1970

Inventor(s) David P. Hass; Hermann Kaiser; and Kenneth W. Schang

It is certified that error appears in the above-identified patent and that said Letters Patent are hereby corrected as shown below:

Column 7, line 53, insert a comma (,) after "sensed".
Column 8, line 37, delete "collision related"; line 48, delete "collision related".

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents